June 10, 1958 L. BESS 2,838,619
LINEAR PUSH-PULL AMPLIFIER
Filed Aug. 22, 1955
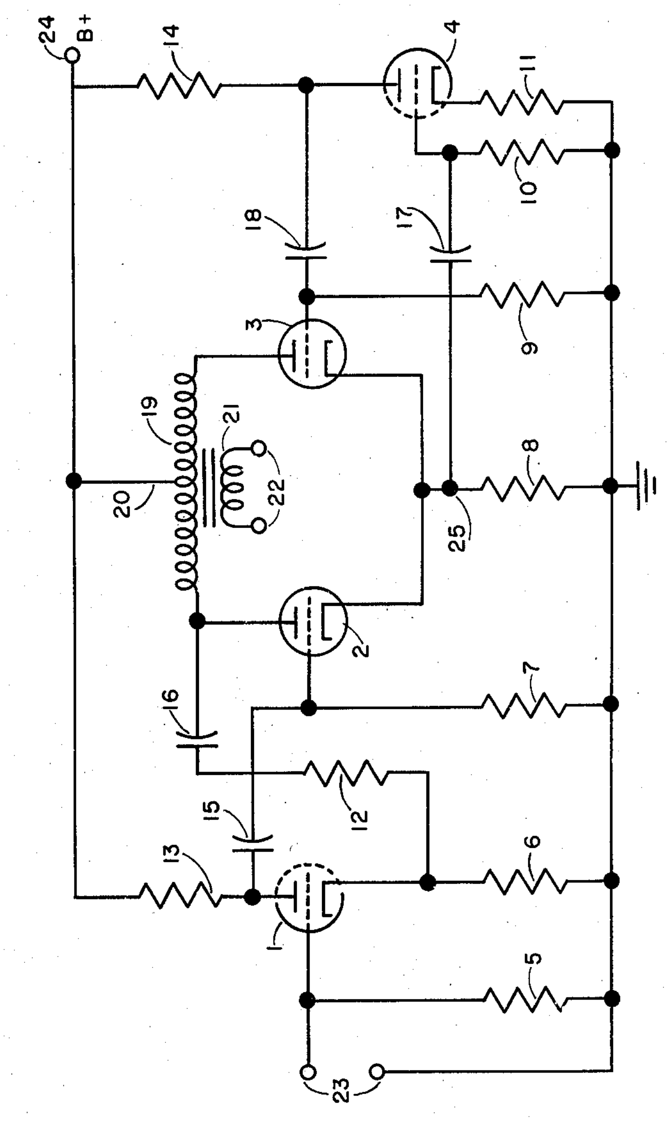
INVENTOR.
*Leon Bess*
BY
Louis I. Shoago 2,838,619
Patented June 10, 1958

2,838,619

LINEAR PUSH-PULL AMPLIFIER

Leon Bess, Allston, Mass.

Application August 22, 1955, Serial No. 529,715

5 Claims. (Cl. 179—171)

This invention relates, generally, to push-pull amplifiers and in particular to a novel push-pull amplifier which incorporates the function of a phase inverter, thereby eliminating the need for a separate phase inverter stage or a push-pull driving transformer. The invention resides in a circuit arrangement comprising two amplifying tubes connected in push-pull in which a control voltage is supplied to the grid circuit of the first push-pull tube, the control voltage for the grid of the second push-pull tube is derived from across a cathode impedance common to both push-pull tubes and in which the derived voltage controls the input impedance at the cathode of the second push-pull tube.

One of the prior methods of obtaining a push-pull input for driving a push-pull amplifier involves the use of a phase inverter stage having a pair of tubes, one tube being connected to the signal source to provide an output of one phase whereas the control voltage for the other tube is derived from the anode impedance of the directly controlled tube. The circuit arrangement is of such a design that the control voltages in the two control grid circuits are equal and in anti-phase so that the phase inverter stage produces a push-pull output which may then be used to drive a push-pull amplifier stage.

Accordingly, it is an object of this invention to provide a push-pull stage which combines the functions of a push-pull amplifier and a phase inverter.

A further object of this invention is the provision of a push-pull amplifier phase inverter which achieves linear phase inversion without requiring a separate phase inverter stage or a driving transformer.

Another object of the invention is to provide a linear push-pull amplifier which does not require a driving transformer, which is efficient in the use of power and which utilizes less tubes than is required in the usual phase inverter and push-pull amplifier circuit arrangement, such as is illustrated by Fig. 21(*a*), page 383, "Radio Engineers' Handbook," first edition, by Terman.

Yet another object is to provide a linear push-pull amplifier having a negative feedback circuit.

Other objects and many of the attendant advantages of this invention will be readily appreciated as the same becomes better understood by reference to the following detailed description when considered in connection with the accompanying drawing which shows a schematic circuit of the invention.

Tube 1 is an amplifying tube arranged to excite the grid of tube 2, tubes 2 and 3 are connected in a push-pull arrangement, and tube 4 is arranged to excite the grid of tube 3.

In the circuit arrangement, tube 1 has its anode coupled to an anode voltage supply source 24 through resistor 13 and the cathode of tube 1 is interconnected with ground through resistor 6. The input to tube 1 is applied at terminals 23 and a signal voltage is developed across grid resistor 5. The anode of tube 1 is coupled to the grid of tube 2 by means of the capacitor 15 and grid-leak resistor 7. A degenerative feedback loop from the anode of tube 2 to the cathode of tube 1 is completed through capacitor 16 and resistor 12. Tubes 2 and 3 have their cathodes coupled together and connected to ground through a common cathode resistor 8. The anodes of tubes 2 and 3 are coupled through a transformer primary winding 19 having a center tap 20 connected to the anode supply source 24. For best results tubes 2 and 3 should have identical characteristics and the transformer should be balanced between the two sections of the primary. The output of the circuit is taken across the terminals 22 of the transformer secondary 21.

A capacitor 17 couples the grid of tube 4 to the common cathode connector at 25. The cathode and grid of tube 4 are connected to ground through resistors 11 and 10, respectively, and the anode of tube 4 is coupled to the anode supply source 24 through resistor 14. The grid of tube 3 is excited from the anode of tube 4 through capacitor 18 and the grid-leak resistor 9 provides a path to ground.

The action of tube 4 is such that it changes the input impedance at the cathode of tube 3 from $$\frac{1}{g_{m_3}}$$

to about $$\frac{1}{g_{m_3}(1+g_{m_4}R_{14})}$$

where $g_{m_3}$ is the transconductance of tube 3
$g_{m_4}$ is the transconductance of tube 4
$R_{14}$ is the resistance of resistor 14

Assuming for the purpose of exposition that a sinusoidally varying signal is applied to the control grid of tube 2 and that the signal is instantaneously increasing in amplitude in the positive direction, tube 2 will commence to conduct an increasing current thereby increasing the IR drop across cathode resistor 8, point 25 is thereby raised to a more positive value with respect to ground causing a positive going signal to excite the grid of tube 4, that tube consequently increases its conduction so that its anode potential drops to a lower value, this in turn excites the grid of tube 3 and tends to decrease the conduction through tube 3. Since the increase in current through tube 2 is offset by the decrease in current through tube 3, the IR drop across resistor 8 remains substantially unchanged while the anode potential of tube 2 will have decreased and the anode potential of tube 3 will have had a corresponding increase. It is apparent, therefore, that resistor 8, in effect, offers a low impedance to the D. C. component of the current flowing through it while offering a high impedance to the flow of signal current. For that reason resistor 8 may be made fairly low (less than 500Ω) in order to conserve power and yet most of the signal cathode current flowing out of the cathode of tube 2 will practically all flow into the cathode of tube 3. Thus, there is a substantial saving in the current drain usually associated with push-pull circuits.

It has been found experimentally that the time constant of resistor 10 and capacitor 17 must be large compared to the time constant of resistor 9 and capacitor 18 to keep the circuit from motorboating.

The values or types of the principal elements used in an experimental audio frequency amplifier having the circuit arrangement shown in the drawing are as follows:

Tube 1 is ½ of type 12AX7
Tubes 2 and 3 are type 6V6
Tube 4 is ½ of type 12AX7
Resistance 6=4,700 ohms
Resistance 7=470,000 ohms Resistance 8=470 ohms
Resistance 9=170,000 ohms
Resistance 10=2,200,000 ohms
Resistance 11=2,200 ohms
Resistance 12=47,000 ohms
Resistance 13=220,000 ohms
Resistance 14=220,000 ohms
Capacitor 15=.01 microfarad
Capacitor 16=8 microfarads
Capacitor 17=.5 microfarad
Capacitor 18=.01 microfarad
Anode voltage=350 volts Obviously, modifications and variations of the present invention are possible in the light of the above teachings. It is therefore to be understood that within the scope of the appended claims the invention may be practiced otherwise than as specifically described.

What is claimed is:

1. A combined push-pull amplifier and phase inverter circuit comprising first and second electron tubes each having a control grid, a signal input terminal coupled to the control grid of said first electron tube, an output transformer having its primary winding connected between the anodes of said tubes, said primary winding having a center tap connected to a potential source, a resistor common to the cathodes of said tubes coupling said cathodes to ground, a third electron tube having its anode connected to said potential source through a load resistor, means coupling the anode of said third tube to the control grid of said second tube, and means coupling the third tube grid control circuit across said common cathode resistor.

2. A linear push-pull amplifier circuit comprising first and second electron tubes each having a control grid, means for coupling input signals to the control grid of said first electron tube, an output transformer having its primary winding connected between the anodes of said tubes, said primary winding having a center tap connected to a potential source, a resistor common to the cathodes of said tubes coupling said cathodes to ground, a third electron tube for amplifying a signal impressed on its control grid, means adapted to couple said amplified signal to the control grid of said second electron tube, and means deriving the input to said third electron tube from the voltage across said common cathode resistor, whereby the amplified output of said third electron tube varies the impedance at the cathode of said second tube so that the voltage drop across said resistor remains substantially constant.

3. A linear push-pull amplifier circuit comprising first and second electron tubes each having a control grid, an output transformer having its primary winding connected between the anodes of said tubes, said primary winding having a center tap connected to a potential source, a resistor common to the cathodes of said tubes coupling said cathodes to ground, a third electron tube for amplifying a signal impressed on its control grid, means adapted to couple said amplified signal to the control grid of said first electron tube, degenerative feedback loop means coupling the anode of said first tube to the cathode of said third tube, a fourth electron tube having a control grid, a load resistor interconnecting the anode of said fourth tube and said potential source, means coupling the anode of said fourth tube to the control grid of said second tube, and coupling means connected across said common cathode resistor arranged to excite said fourth tube control grid.

4. A linear push-pull electronic circuit comprising, first and second electron tubes each having a control grid, an output transformer having its primary winding connected between the anodes of said tubes, said primary winding having a center tap connected to a source of electric potential, a resistor common to the cathodes of said tubes coupling said cathodes to ground, means for impressing input signals upon the control grid of said first electron tube, an amplifier excited by changes in voltage across said common cathode resistor, and means coupling the output of said amplifier to the control grid of said second electron tube whereby a change in conduction of said first electron tube is offset by a corresponding opposing change in conduction of said second electron tube.

5. A linear push-pull amplifier circuit comprising, in combination, a first and second electron tube, each of said tubes having at least a cathode, an anode and a control grid, an output transformer having its primary winding connected between the anodes of said tube and its center tap connected to a source of operating potential, a cathode resistor connecting the cathodes of both of said tubes to a reference potential, a third multi-electrode electron tube, said third tube having at least a cathode, a control grid and an anode, a load resistor connecting the anode of said third tube to said source of operating potential, a first grid leak resistor connecting the control grid of said third electron tube to said reference potential, a first coupling capacitor connected between the cathodes of said first and second tubes and the control grid of said third tube, a second grid leak resistor connected between the control grid of said second tube and said reference potential and a second coupling capacitor connected between the anode of said third tube and the control grid of said second tube, the time constant of said first coupling capacitor and said first grid leak resistor being large compared to the time constant of said second coupling capacitor and said second grid leak resistor, and means for coupling a signal to be amplified to the control grid of said first electron tube.

References Cited in the file of this patent

UNITED STATES PATENTS

| | | |
|---|---|---|
| 1,654,075 | Gorton | Dec. 27, 1927 |
| 2,221,102 | Mayer | Nov. 12, 1940 |
| 2,524,712 | Ostreicher et al. | Oct. 3, 1950 |
| 2,560,715 | Trousdale | July 17, 1951 |
| 2,721,908 | Moe | Oct. 25, 1955 |
| 2,743,321 | Coulter | Apr. 24, 1956 |